Figure 1:
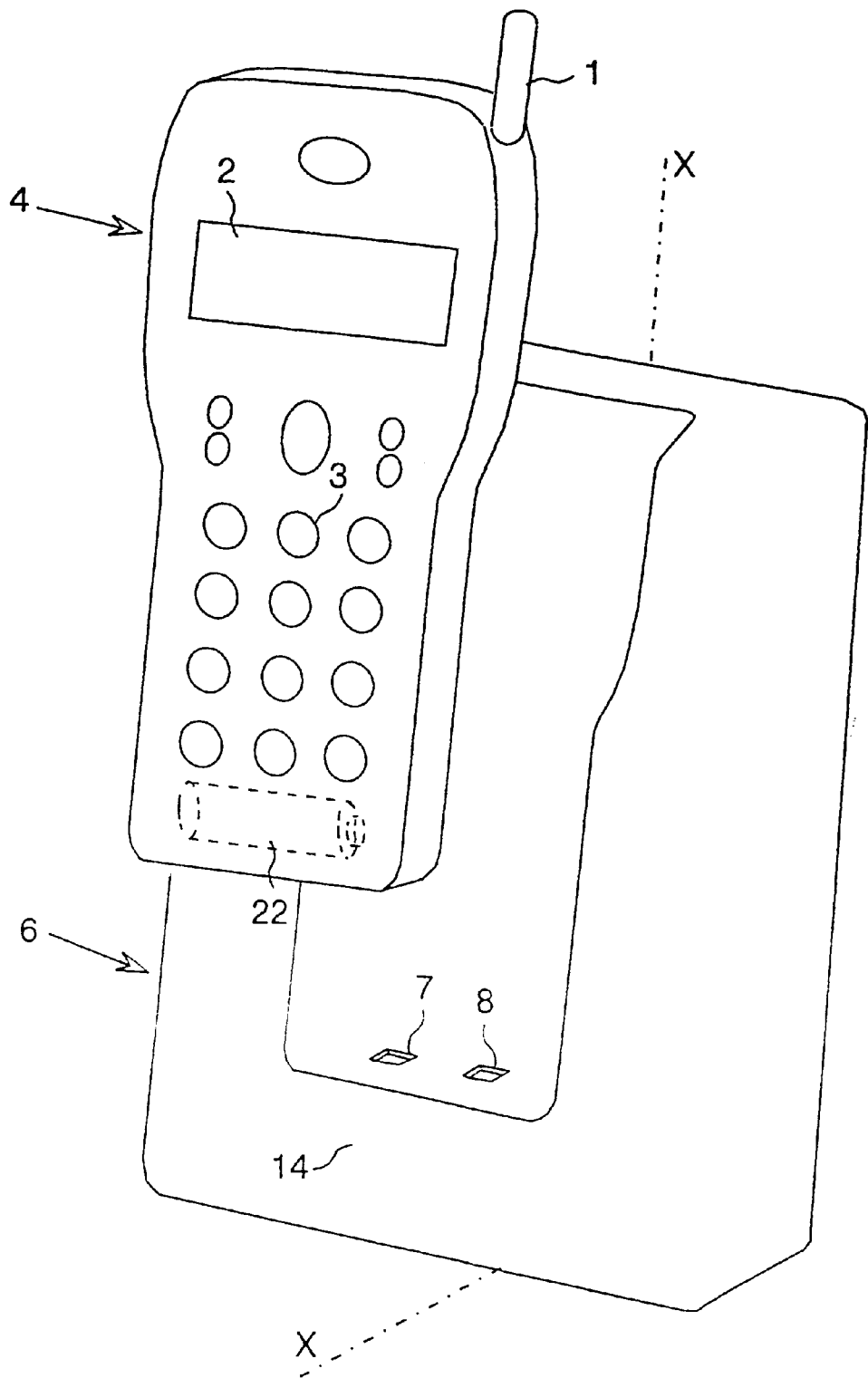

United States Patent [19]
Pinel

[11] Patent Number: 5,931,683
[45] Date of Patent: Aug. 3, 1999

[54] DEVICE WITH RETRACTABLE CONTACTS

[75] Inventor: Marcel Pinel, Le Mans, France

[73] Assignee: U.S. Philips Corporation, New York, N.Y.

[21] Appl. No.: 09/102,472

[22] Filed: Jun. 22, 1998

[30] Foreign Application Priority Data

Jun. 26, 1997 [FR] France ................................. 97 08036

[51] Int. Cl.⁶ .................................................. H01R 11/30
[52] U.S. Cl. ................................ 439/39; 439/929; 320/2
[58] Field of Search ................................. 320/2; 439/500, 439/188, 923, 929, 38–40

[56] References Cited

U.S. PATENT DOCUMENTS

| | | | |
|---|---|---|---|
| 2,742,619 | 4/1956 | Buquor | 439/39 |
| 3,868,160 | 2/1975 | Kersman | 439/39 |
| 4,647,120 | 3/1987 | Karabakakis | 439/39 |

FOREIGN PATENT DOCUMENTS

| | | | |
|---|---|---|---|
| 2644301 | 9/1990 | France | 439/39 |
| 07162494 | 6/1995 | Japan . | |

*Primary Examiner*—Khiem Nguyen
*Attorney, Agent, or Firm*—Dicran Halajian

[57] ABSTRACT

An invention is disclosed which has a contact element having a part mounted on an electrically conductive leaf spring and which part is connected to an electric circuit; in a state of rest the part is positioned behind a wall, but it projects outward through an opening under the influence of a magnet carried by an apparatus to be connected, so as to make contact with a contact plate carried by this apparatus when it is coupled to the device.

4 Claims, 2 Drawing Sheets

DEVICE WITH RETRACTABLE CONTACTS

The present invention relates to a device for charging an apparatus whose power is supplied by a battery, the device comprising a casing which has contact elements of which at least one has a mobile contact element capable of being retracted to inside the casing or, on the other hand, projecting outside the casing through an opening while attracted by a magnet carried by the apparatus to be charged, and an apparatus whose power is supplied by a battery comprising a casing which has a contact plate for charging its battery by means of a device according to the invention with a magnet for attracting a mobile element of the device, the contact plate being positioned opposite the contact element of the device when the apparatus is coupled to the device to be recharged there.

The invention applies to any apparatus whose power is supplied by a battery, for example, portable telephones, power tools, electric razors, auditory aids, etc.

A device as defined in the opening paragraph above is known from the document PATENT ABSTRACTS OF JAPAN no. 07162494 (Funai Electric CO. Ltd.). According to this document, the device comprises a contact element mounted on a support which has an axis of rotation and which in a state of rest is lowered in the body of the device under the influence of its own weight; when the apparatus is put on the device the element is attracted by a magnet situated in the apparatus so as to establish contact with the apparatus.

It is an object of the invention to simplify the manufacturing and mounting of the device.

For this purpose, the mobile element is made of a metal which is both electroconductive and ferromagnetic, mechanically and electrically connected to an electrically conductive spring which itself is electrically connected to an electric circuit, which spring is positioned so that in a state of rest the contact element is retracted to inside the casing.

In a particular embodiment, the contact element is carried by one end of a leaf spring.

Advantageously, the contact element and the leaf spring form one whole.

Whereas the device includes a printed circuit, the other end of the leaf spring is advantageously soldered onto a metallic layer of the printed circuit.

Advantageously, an apparatus comprises two contact plates and a single magnet for the two contact plates.

These and other aspects of the invention will be apparent from and elucidated with reference to the embodiments described hereinafter.

Figure 2:
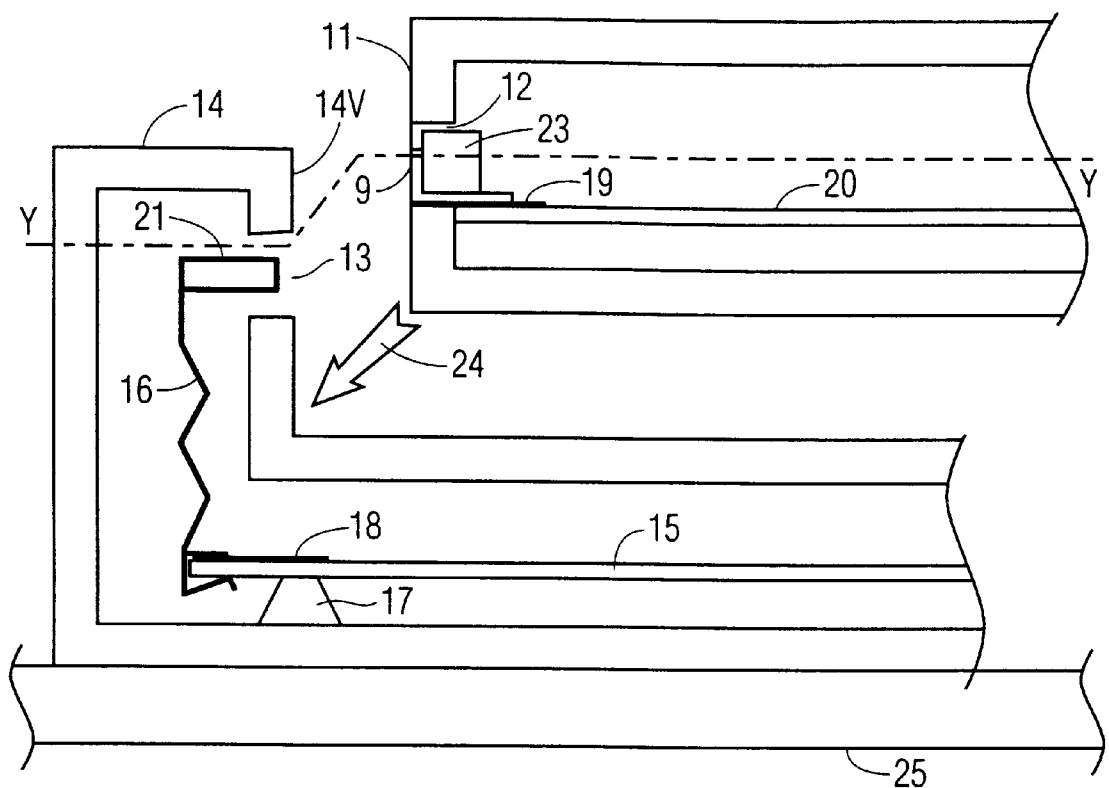
Figure 3:
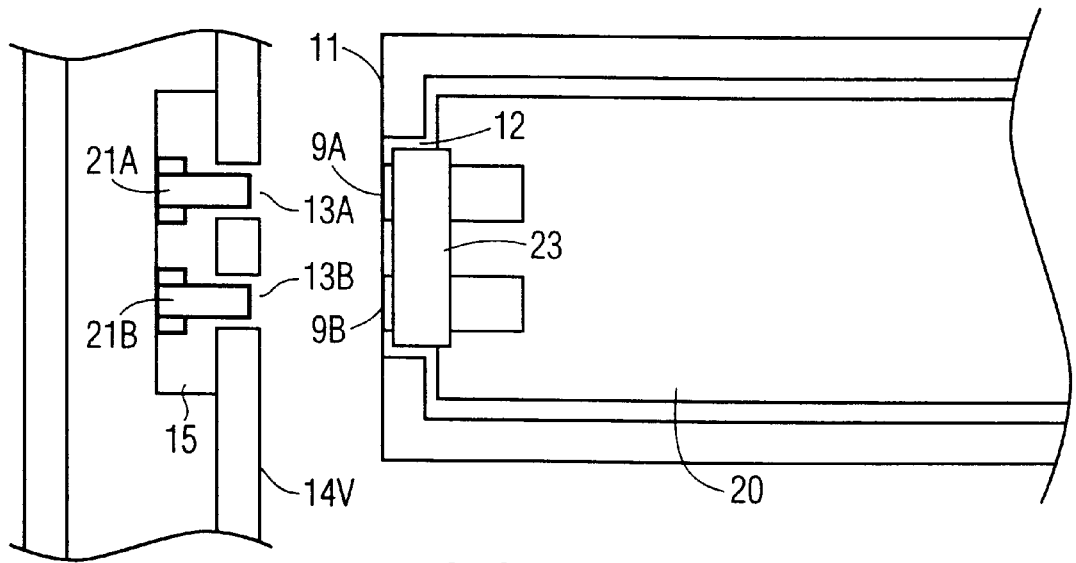

In the drawings:

FIG. 1 represents in a perspective view an apparatus whose power is supplied by a battery and a device for recharging the battery, FIG. 2 represents in a diagram in a cross-sectional view along plane X—X of FIG. 1, a part of a device and a part of an apparatus close to being coupled to each other, FIG. 3 represents in a diagram in a cross-sectional view along axis Y—Y of FIG. 2 a part of a device and a part of an apparatus close to being coupled to each other.

The apparatus whose power is supplied by a battery represented in FIG. 1 is a portable telephone 4 here. It comprises a body containing a battery 22 and further has a keyboard 3 and a screen 2 and an antenna 1 for receiving or transmitting radio waves. For charging its battery, the apparatus may be put in a compartment of a charging device 6 which has two contact elements 7, 8.

The device 6 may be put flat on its back face, for example, not shown in the Figure, in which case its face denoted 14 is the top face. It is in this position that it is partly represented in cross-sectional view in FIG. 2 where the device is put flat on a platform 25. The upper wall of the casing of the charging device y is denoted 14 as in FIG. 1. The Figure corresponds to the case where the apparatus is close to being coupled to the device to be charged there: the apparatus to be charged will be brought into the compartment of the device by a movement indicated by the arrow 24.

The contact element of the device comprises a metallic mobile element 21 which is situated in a state of rest behind the vertical part 14V of the outer surface of the device which has an opening 13 which opening permits the element 21 to move to project outward. The element 21 is fixed to one end of an elastic plate 16 which allows it to move horizontally.

The plate 16 is electrically conductive and its other end is electrically connected to a charging circuit (not shown) which does not form part of the invention. The device here has a printed circuit 15 supported by a raised member 17 and said other end of the elastic plate 16, which is a leaf spring for example, is soldered onto a metallic layer 18 of this printed circuit, for example, to the end of the latter, to which the end of the spring is further pinched to facilitate the handling of the printed circuit before soldering. The element 21 and the leaf spring 16 form one whole here. The material of the latter may, for example be copper-clad steel and/or tinned steel.

It will be obvious that several variants may be conceived, for example, in the case where there is different geometry of the device/apparatus assembly, the spring could be a spiral spring; however, such a spring would not provide as accurate a positioning of the element 21.

The casing of the charging apparatus is indicated by 11, it has on its edge an opening 12 through which passes a contact 9. The apparatus here includes a printed circuit 20, and the plate 9 is directly soldered onto a metallic layer 19 of this printed circuit. Immediately behind the contact plate is situated a magnet 23 which attracts the mobile contact element 21 of the charging device when the apparatus is put in the compartment of this device and when its face 11 is applied against the face 14V.

FIG. 3 represents the same elements seen from above. The device comprises two mobile elements 21A, 21B fixed to the printed circuit 15, and the apparatus has two contact plates 9A, 9B fixed to the printed circuit 20. A single magnet 23 at the same time attracts the mobile elements 21A and 21B.

I claims:

1. An apparatus whose power is supplied by a battery, comprising a casing which has a contact plate for charging the battery by means of a device for charging the apparatus, wherein the casing has contact elements of which at least one has a mobile contact element capable of being retracted inside the casing or being projected outside the casing through an opening while attracted by a magnet carried by the apparatus to be charged, wherein the mobile contact element is made of a metal which is both electroconductive and ferromagnetic, and is mechanically and electrically connected to an electrically conductive spring, said spring being electrically connected to an electric circuit, and being positioned so that, in a state of rest, the mobile contact element is retracted inside the casing, said apparatus having a magnet for attracting the mobile contact element of the device, the contact plate being positioned opposite the contact element of the device when the apparatus is coupled to the device to be charged, said apparatus further having two contact plates and a single magnet for the two contact plates.

2. The apparatus of claim 1, wherein the contact element is carried by one end of a leaf spring.

3. The apparatus of claim 2, wherein the contact element and the leaf spring form one whole.

4. The apparatus of claim 2, further comprising a printed circuit, wherein the other end of the leaf spring is soldered onto a metallic layer of the printed circuit.

* * * * *